United States Patent [19]

Okano

[11] Patent Number: 4,580,166
[45] Date of Patent: Apr. 1, 1986

[54] SYNCHRONIZING SIGNAL SEPARATOR NETWORK

[75] Inventor: Takashi Okano, Tokorozawa, Japan

[73] Assignee: Pioneer Video Corporation, Tokyo, Japan

[21] Appl. No.: 444,616

[22] Filed: Nov. 26, 1982

[30] Foreign Application Priority Data

Nov. 27, 1981 [JP] Japan .................. 56-191295

[51] Int. Cl.⁴ .............................................. H04N 5/08
[52] U.S. Cl. ...................................... 358/153; 328/139
[58] Field of Search .............. 358/139, 153, 155, 156, 358/19, 20; 328/139

[56] References Cited

U.S. PATENT DOCUMENTS

| | | | |
|---|---|---|---|
| 3,525,805 | 8/1970 | Busby, Jr. | 358/139 |
| 3,569,844 | 3/1971 | Lynn | 358/153 |
| 4,254,435 | 3/1981 | Dayton et al. | 358/153 |
| 4,417,268 | 11/1983 | LaSota | 358/139 |
| 4,456,927 | 6/1984 | Marin | 358/153 |

FOREIGN PATENT DOCUMENTS 52-50116 4/1977 Japan .................. 358/154

Primary Examiner—Tommy P. Chin
Assistant Examiner—Victor R. Kostak
Attorney, Agent, or Firm—Schwartz, Jeffery, Schwaab, Mack, Blumenthal & Evans

[57] ABSTRACT

A synchronizing signal separator network for use in an information reproducing system including a time-axis error signal generator, comprising a non-linear impedance circuit to non-linearly modify the amplitude of a supplied composite video signal for suppressing the video signal component of the composite video signal, a differentiating circuit to differentiate the output signal from the non-linear impedance circuit and a slicing circuit to slice off those portions of the output signal from the differentiating circuit which are higher in magnitude than a predetermined level, the output signal from the slicing circuit being used to produce a signal to be compared with a predetermined reference time-axis error signal signal in the time-axis error signal generator.

8 Claims, 8 Drawing Figures

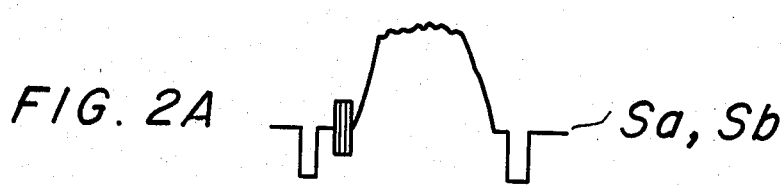
FIG. 2A  Sa, Sb
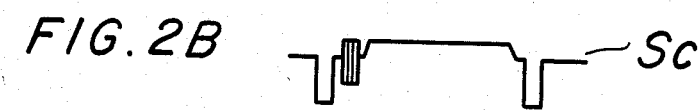
FIG. 2B  Sc
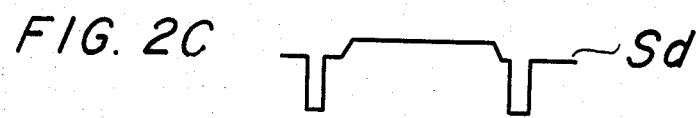
FIG. 2C  Sd
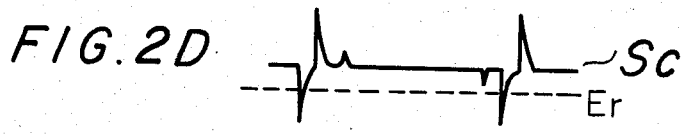
FIG. 2D  Sc
Er
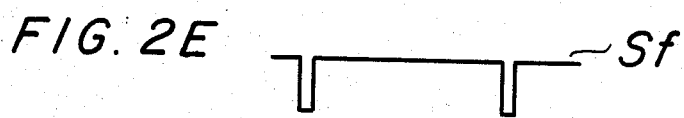
FIG. 2E  Sf

SYNCHRONIZING SIGNAL SEPARATOR NETWORK

FIELD OF THE INVENTION

The present invention relates to a synchronizing signal separator network and, more particularly, to a synchronizing signal separator network for use in an information reproducing system for reproducing the video information recorded on a record medium such as a video disc.

BACKGROUND OF THE INVENTION

An information reproducing system for reproducing the video information recorded on, for example, a video disc usually has a time-axis error signal generator incorporated therein. The time-axis error signal generator detects the time-axis variation in the video signal to be reproduced and produces a time-axis error signal to make a time-axis correction of the video signal. A known variant of such a time-axis error signal generator is constructed in such a manner as to produce a timing signal through detection of a specific point of a color burst signal and to compare the phase of the timing signal with the phase of a reference horizontal synchronizing pulse extracted from a reference signal generator. The time-axis error signal generator produces as the time-axis error signal a signal representative of the difference between the respective phases of the two signals thus compared with each other. The specific point of the color synchronizing burst is usually given as a point at which the burst crosses a preselected reference level. A time-axis error signal generator of the above described nature is however not fully acceptable since correct and reliable time-axis error signals can not be produced during vertical synchronizing pulse intervals when color synchronizing bursts are absent in the composite video signal.

Another prior-art variant of a time-axis error signal generator is constructed so that a time-axis error signal is produced upon comparison of the phases of the played back horizontal synchronizing pulses in the video signal with a phase of a reference horizontal synchronizing signal. From a theoretical point of view, the time-axis error signal produced by such a time-axis error signal generator must be fully dependable since the horizontal synchronizing pulses are present during vertical synchronizing pulse intervals.

As well known in the art, synchronizing signal components of a composite video signal are separated from the composite video signal by clamping the pedestal or synch-tip level of the composite video signal to a predetermined voltage level and thereafter slicing the signal at a desired level to produce synchronizing pulses. The accuracy of clamping as achieved in the separation of the synchronizing pulses in this fashion depends primarily on the signal-to-noise ratio in the supplied composite video signal and the stability of the clamping circuit against noise. The clamped level of the composite video signal is thus subject to fluctuation and, for this reason, the synchronizing signals separated from the composite video signal tend to vary in phase when the fall-times of the synchronizing pulses contained in the composite video signal and the clamped level of the composite video signal vary. This means that a satisfactorily high accuracy can not be achieved when a time-axis correction is made with use of a time-axis error signal produced through detection of the time-axis fluctuations of the video signal on the basis of the horizontal synchronizing pulses obtained from the synchronizing signals separated from a composite video signal as in the latter type of time-axis error signal generator.

It is, accordingly, a prime object of the present invention to provide a synchronizing signal separator network in which a time-axis correction of the composite video signal can be effected with satisfactory accuracy by producing a synchronizing signal with supressed phase variation.

SUMMARY OF THE INVENTION

In accordance with the present invention, there is provided a synchronizing signal separator network for use in an information reproducing system in which a composite video signal is to be reproduced into a video image and which includes a time-axis error signal generator, comprising a non-linear impedance circuit for non-linearly modifying the aplitude of the composite video signal and thereby suppressing the video signal component of the composite video signal; a subcarrier trapping circuit for trapping the subcarrier component of the output signal from the non-linear impedance circuit; a differentiation circuit for differentiating the output signal from the subcarrier trapping circuit; and a slicing circuit for slicing off those portions of the output signal from the differentiating circuit which are greater in magnitude than a predetermined level, the output signal from the slicing circuit being used to produce a signal to be compared with a predetermined reference signal in the time-axis error signal generator. A synchronizing signal separator network thus constructed and arranged may further comprise an equalizing pulse eliminating circuit which consists essentially of a series combination of first and second monostable multivibrators each having a trigger terminal and an inverted output terminal and provided with a time-constant network, the trigger and inverted output terminals of the first monostable multivibrator being connected to to the output terminal of the slicing circuit and to the trigger terminal of the second monostable multivibrator, respectively, and the inverted output terminal of the second monostable multivibrator being connected to the time-axis error signal generator, the time constant network of the first monostable multivibrator being such that pulses to be delivered from the inverted output terminal of the second monostable multivibrator have a pulse-width longer than one half of each time interval between horizontal synchronizing lines and shorter than the particular time interval.

BRIEF DESCRIPTION OF THE DRAWINGS

The features and advantages of a synchronizing signal separator network according to the present invention will be more clearly appreciated from the following description taken in conjunction with the accompanying drawings in which:

FIGS. 2A–2E are views showing waveforms which appear in the circuit arrangement illustrated in FIG. 1;

DESCRIPTION OF THE PREFERRED EMBODIMENT

Figure 1:
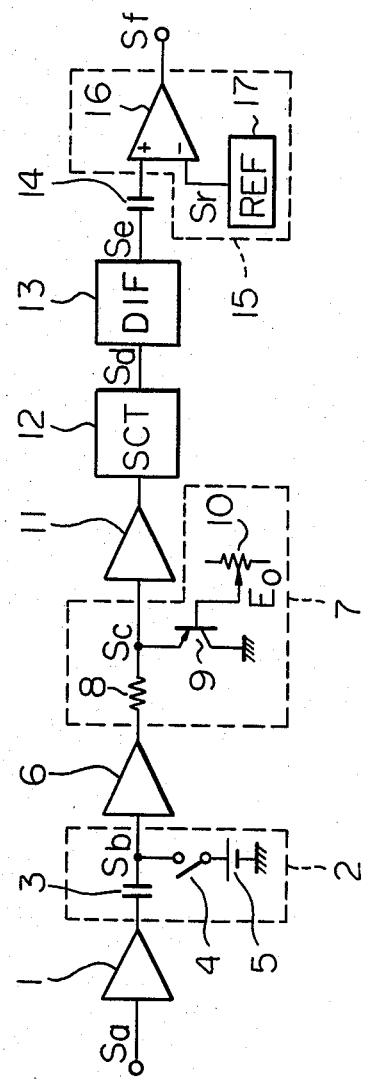
FIG. 1 is a diagram showing the circuit arrangement of a preferred embodiment of a synchronizing signal separator network according to the present invention.

Referring to FIG. 1 of the drawings, a synchronizing signal separator network embodying the present invention comprises a first buffer amplifier 1 having an input terminal connected to a source (not shown) of a composite video signal Sa and an output terminal connected to a clamping circuit 2. The clamping circuit 2 is shown composed of a capacitor 3 having one electrode connected to the output terminal of the first buffer amplifier 1 and the other electrode connected to to ground across a series combination of a switching element 4 and a source 5 of a constant voltage E. The capacitor 3 is provided to cut off the direct-current component of the composite video signal Sa passed through the first buffer amplifier 1. The switching element 4 is adapted to close during the intervals when the luminance signal component of the composite video signal is at a suitable predetermined level such as, for example, the pedestal or sync-tip level of the composite video signal. The pedestal or sync-tip level of the composite video signal Sa passed through the first buffer amplifier 1 to the clamping circuit 2 is thus clamped to the constant voltage E and a composite video signal Sb having the clamped pedestal level E is delivered from the clamping circuit 2. The clamping circuit 2 has an output terminal connected to through a second buffer amplifier 6 to an input terminal of a non-linear impedance circuit 7, which is shown composed of a resistor 8 connected between the output terminal of the second buffer amplifier 6 and a transistor 9. The transistor 9 has its emitter connected to to the output terminal of the second buffer amplifier 6 through the resistor 8 and its collector grounded so that the composite video signal Sb passed through the second buffer amplifier 6 and the resistor 6 is fed to the emitter of the transistor 9. The transistor 9 further has its base connected to a sliding contact of a potentiometer 10 which forms part of the non-linear impedance circuit 7. The emitter of the transistor 9 constitutes an output terminal of the non-linear impedance circuit 7 and a signal Sc produced at such an output terminal is fed through a third buffer amplifier 11 to a subcarrier trapping circuit 12 (SCT). The subcarrier trapping circuit 12 is adapted to trap the color subcarrier component of the signal Sc supplied to the input terminal thereof and to deliver a resultant signal Sd to a differential circuit 13 (DIF) adapted to differentiate the signal Sd with respect to time. The differentiating circuit 13 composed of a resistor and a capacitor, though not shown in the drawings. The differentiating circuit 13 delivers an output signal Se, by way of a coupling capacitor 14, to a slicing circuit 15 composed of a comparator 16 having a positive input terminal connected to the differentiating circuit 13 through the coupling capacitor 14 and a negative input terminal connected to a reference signal generator 17. The reference signal generator 17 is adapted to produce a reference signal Sr representative of a predetermined voltage Er at which the signal Se supplied through the coupling capacitor 14 to the comparator 16 is to be sliced. When the voltage of the signal Se fed to the positive input terminal of the comparator 16 is higher than the voltage level Er of the reference signal Sr supplied from the reference signal generator 17, a signal Sf is delivered, as a synchronizing signal Sf separated from the original composite video signal Sa, from the output terminal of the comparator 16 to a time-axis variation detector circuit (not shown).

In respect of the function of the synchronizing signal separator network thus constructed and arranged, description will be hereinafter made on the assumption that a composite video signal Sa having a waveform shown in FIG. 2A is supplied through the first buffer amplifier 1 to the clamping circuit 2. The pedestal or sync-tip level of the composite video signal Sa thus fed to the clamping circuit 2 is clamped to the predetermined voltage Eo by means of the switching element 4 of the clamping circuit 2. In response to the composite video signal Sb delivered from the clamping circuit 2, the potential at the emitter of the transistor 9 attempts to rise beyond the potential at the base of the transistor 9 and thereby activates the transistor 9. It therefore follows that the potential at the emitter of the transistor 9 is maintained lower than the potential at the base of the transistor 9 by a value equal to the voltage Vbe between the base and emitter. If the potentiometer 10 of the non-linear impedance circuit 7 is adjusted so that the potential to appear at the base of the transistor 9 is in the vicinity of the clamped pedestal level of the composite video signal Sb, the signal Sc produced at the emitter of the transistor 9 in the clamping circuit 2 will assume a waveform shown in FIG. 2B. The waveform of the signal Sc is such that the picture information in the composite video signal Sb with the clamped level is flattened and suppressed to a certain level higher than the black or blanking level. At this point, the signal may be further conditioned to produce. The signal Sd delivered from a subcarrier trapping circuit by trapping the color subcarrier component of such a signal Sc. This signal would have a waveform such as that represented by waveform in FIG. 2c, from which it will be seen that the signal Sd consists largely of a synchronizing signal alone while the front and back porches thereof remain thereby to keep original horizontal sync timing information. The signal Se from the differentiating circuit 13 has a waveform shown in FIG. 2D and contains pulses having opposite polarities and relatively large amplitudes and occurring at the leading and trailing edges of each of the horizontal synchronizing pulses in the synchronizing signal. If the voltage level Er of the reference signal Sr to be supplied from the reference signal generator 17 of the slicing circuit 15 is selected so that the slicing circuit 15 is operative to slice off only the pulses appearing at the output terminal of the differentiating circuit 13 in response to the leading edges of the horizontal synchronizing pulses, the output signal Sf from the slicing circuit 15, viz., the comparator 16 provided therein willhave a waveform indicated in FIG. 2. It is to be understood that subcarrier trapping may be accomplished at any stage before differentiating circuit 13, if preferred. For example, a low pass filter may be placed before the clamping circuit 2 so as to eliminate the subcarrier component. If, furthermore, the original composite video signal is monochromic, subcarrier trapping is, of course, unnecessary.

In the differentiating circuit 13 of the synchronizing signal separator network hereinbefore described, the output signal Se from the differentiating circuit 13 is produced by differentiating synchronizing signal component of the output signal Sd from the subcarrier trapping circuit 12 with respect to time. The level of the signal Se produced in this manner varies for extremely short periods of time and, for this reason, the level of the d.c. component of the signal Se remains practically constant. It therefore follows that the pulse components of the synchronizing signal Sf produced by slicing the output signal Se from the differential circuit 13 have practically fixed phases and are thus useful for effecting a time-axis correction with utmost accuracy.

The synchronizing signal Sf delivered from the slicing circuit 15 contains not only the horizontal synchronizing pulses but equalizing pulses which are to appear during, for example, vertical synchronizing pulse intervals. Such a synchronizing signal Sf can not be compared in respect of phase directly with a reference horizontal synchronizing signal. In the synchronizing signal separator network embodying the present invention, the synchronization signal Sf is for this reason modified into a horizontal synchronizing signal which is composed of a succession of pulses to appear during each interval (herein denoted by H) between horizontal synchronizing lines and which can be compared directly with the reference horizontal synchronizing signal. A preferred example of a circuit to achieve such an end is illustrated in FIG. 3 of the drawings.

Figure 3:
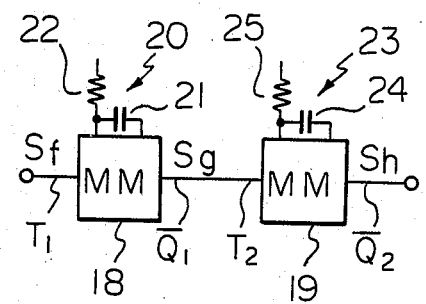
FIG. 3 is a diagram showing a circuit which may be additionally provided in a synchronizing signal separator network according to the present invention.
Figure 4:
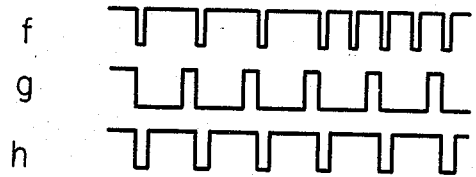
FIG. 4 is a view showing waveforms to appear in the circuit illustrated in FIG. 3.

Referring to FIG. 3, the above mentioned circuit comprises a series combination of first and second monostable multivibrators 18 and 19 (MM). The first monostable multivibrator 18 has its trigger terminal $T_1$ connected to the output terminal of the slicing circuit 15 of the network shown in FIG. 1 and is thus triggered by the synchronizing signal Sf delivered from the comparator 16 of the slicing circuit 15. The monostable multivibrator 18 is provided with a time-constant network 20 composed of a combination of a capacitor 21 and a resistor 22 and is operative to produce, at its inverted output terminal $\overline{Q}_1$, pulses Sg having a pulsewidth dictated by the time constant determined by the time-constant network 20 after the signal Sf is fed to the trigger terminal $T_1$ of the monostable multivibrator 18. The capacitance and resistance of the capacitor 21 and resistor 22, respectively, are selected so that the duration of each of the pulses Sg thus appearing at the inverted output terminal $\overline{Q}_1$ of the monostable multivibrator 18 is longer than one half of the interval H between horizontal synchronizing lines and shorter than the interval H. If, in this instance, the synchronizing signal Sf containing the equalizing pulses as indicated by waveform f in FIG. 4 is fed to the first monostable multivibrator 18, the monostable multivibrator 18 is triggered at the intervals H so that the pulses Sg appearing at the inverted output terminal $\overline{Q}_1$ have a waveform g shown in FIG. 4. The ulses Sg having such a waveform g are fed to the trigger terminal $T_2$ of the second monostable multivibrator 19. The monostable multivibrator 19 is also provided with a time-constant network 23 composed of a combination of a capacitor 24 and a resistor 25 and is operative to produce, at its inverted output terminal $\overline{Q}_2$, pulses Sh having a pulsewidth dictated by the time constant determined by the capacitance and resistance of the capacitor 24 and resistor 25 of the time-constant network 23 at the time intervals H after the pulses Sg are fed to the trigger terminal $T_2$ of the monostable multivibrator 19. The inverted output terminal $\overline{Q}_2$ of the second monostable multivibrator 19 is connected to to a time-axis error signal generator (not shown) so that the output signal Sh delivered from the output terminal $\overline{Q}_2$ is compared in respect of phase with a predetermined reference horizontal synchronizing signal.

What is claimed is:

1. In a horizontal synchronizing signal separator network for separating the horizontal synchronizing signal from a composite video signal, the improvement which comprises:

a clamping circuit for clamping a preselected level of the composite video signal at a predetermined clamp level;

a non-linear impedance circuit for non-linearly modifying the amplitude of the output signal from said clamping circuit and thereby suppressing the video signal component of the composite video signal to a level above the blanking level of said composite video signal;

a differentiating circuit for differentiating the output signal from said non-linear impedance circuit with respect to time; and a slicing circuit for slicing off those portions of the output signal from said differentiating circuit which are greater in magnitude than a predetermined level for obtaining said horizontal synchronizing signal.

2. A synchronizing signal separator network as set forth in claim 1, in which said clamping circuit comprises switching means having one terminal connected between said clamping circuit and said non-linear impedance circuit and another terminal connected to ground across a constant-voltage source, said switching means being adapted to be closed when the luminance signal component of said composite video signal is at a predetermined level.

3. A synchronizing signal separator network as set forth in claim 1, in which said non-linear impedance circuit comprises a transistor having its emitter connected between said clamping circuit and a subcarrier trapping circuit and its collector connected to ground, and a potentiometer having a sliding contact connected to to the base of said transistor.

4. A synchronizing signal separator network as set forth in claim 1, in which said slicing circuit comprises a reference signal generator operative to produce a reference signal representative of a desired level at which the output signal from said differentiating circuit is to be sliced, and a comparator having one input terminal connected to the differentiating circuit and another input terminal connected to the reference signal generator.

5. A synchronizing signal separator network as set forth in claim 1, further comprising an equalizing pulse eliminating circuit consisting of a series combination of first and second monostable multivibrators each having a trigger terminal and an inverted output terminal and provided with a time-constant network, the trigger and inverted output terminals of the first monostable multivibrator being connected to to the output terminal of said slicing circuit and to the trigger terminal of the second monostable multivibrator, respectively, and the inverted output terminal of the second monostable multivibrator being connected a time-axis error signal generator, the time constant network of the first monostable multivibrator being such that pulses to be delivered from the inverted output terminal of the second monostable multivibrator having a pulsewidth longer than one-half of each time interval between horizontal synchronizing lines and 6. A synchronizing signal separator network as set forth in claim 5, in which said clamping circuit comprises switching means having one terminal connected between said clamping circuit and said nonlinear impedance circuit and another terminal connected to ground across a constant-voltage source, said switching means being adapted to be closed when the luminance signal component of said composite video signal is at a predetermined level.

7. A synchronizing signal separator network as set forth in claim 5, in which said non-linear impedance circuit comprises a transistor having its emitter connected between said clamping circuit and a subcarrier trapping circuit and its collector connected to ground, and a potentiometer having a sliding contact connected to the base of said transistor.

8. A synchronizing signal separator network as set forth in claim 5, in which said slicing circuit comprises a reference signal generator operative to produce a reference signal representative of a desired level at which the output signal from said differentiating circuit is to be sliced, and a comparator having one input terminal connected to the differentiating circuit and another input terminal connected to the reference signal generator.

* * * * *